United States Patent [19]
Mintgen et al.

[11] Patent Number: 5,116,028
[45] Date of Patent: May 26, 1992

[54] PRESSURE TUBE-PISTON DEVICE

[75] Inventors: Rolf Mintgen, Thür; Winfried Wirges, Koblenz, both of Fed. Rep. of Germany; Udo Wagner, Dachsenhausen, Netherlands

[73] Assignee: Stabilus GmbH, Koblenz-Neuendorf, Fed. Rep. of Germany

[21] Appl. No.: 587,024

[22] Filed: Sep. 24, 1990

[30] Foreign Application Priority Data

Oct. 6, 1989 [DE] Fed. Rep. of Germany ....... 3933360

[51] Int. Cl.$^5$ ................................................. F16F 5/00
[52] U.S. Cl. .................. 267/64.12; 188/300; 137/599.2
[58] Field of Search ............... 267/64.12; 188/300, 188/269; 137/599.2

[56] References Cited

U.S. PATENT DOCUMENTS

| | | | |
|---|---|---|---|
| 2,975,803 | 3/1961 | Vallee | 137/599.2 |
| 3,081,919 | 3/1963 | Samuel | 137/599.2 |
| 3,303,746 | 2/1967 | Schmoeger | 137/599.2 |
| 4,307,875 | 12/1981 | Schnitzius et al. | 267/120 |
| 4,784,375 | 11/1988 | Wirges | 267/64.12 |
| 4,949,941 | 8/1990 | Bauer et al. | 267/64.12 |
| 4,993,522 | 2/1991 | Wagner | 267/64.12 X |

FOREIGN PATENT DOCUMENTS

| | | |
|---|---|---|
| 163007 | 12/1985 | European Pat. Off. |
| 1964992 | 7/1967 | Fed. Rep. of Germany |
| 2498721 | 7/1982 | France |
| 320990 | 5/1957 | Switzerland |
| 1592483 | 7/1981 | United Kingdom |

*Primary Examiner*—Douglas C. Butler
*Assistant Examiner*—Young Lee W.
*Attorney, Agent, or Firm*—Brumbaugh, Graves, Donohue & Raymond

[57] ABSTRACT

According to an illustrative example of the present invention, a gas spring comprises a pressure tube, a piston rod and a piston connected with the piston rod within the pressure tube. The piston divides the pressure tube into two working spaces, the two working spaces are connected by a control flow passage. A control valve body is allocated to the control valve passage and is controlled through a bore of the piston rod. The control valve body contains an excess pressure flow passage. An excess pressure valve member is provided within the excess pressure flow passage and biased toward an excess pressure valve seat of said control valve body.

21 Claims, 3 Drawing Sheets

PRESSURE TUBE-PISTON DEVICE

BACKGROUND OF THE INVENTION

In the pressure tube-piston devices, such as gas springs, the axial position of the piston and of a piston rod connected thereto can be continuously varied by opening a control valve passage and closing it again after the desired position has been obtained. Such pressure tube piston devices may be provided for positioning a secondary object with respect to a primary object. It is frequently desirable that in case of excess forces applied to the secondary object, the pressure tube-piston device is length variable due to an overload security function.

By such an overload security function damaging of the system comprising the first and the secondary object and the pressure tube-piston device can be avoided.

STATEMENT OF THE PRIOR ART

A pressure tube-piston device providing such as overload security function is known from German Patent Publication 36 29 250 and from the corresponding U.S. Pat. No. 4,784,375. In the pressure tube-piston device known from these publications, a flow passage extends through the piston. A valve body unit is allocated to said flow passage. This valve body unit cooperates with a valve body engagement ring. The valve body unit is controlled through a bore of the piston rod. The valve body engagement ring is biased towards an engagement position with respect to the piston in which the valve body engagement ring is in sealing engagement with the valve body unit, when the valve body unit is in a closing position. The valve body engagement ring is movable out of its engagement position by a predetermined pressure difference between two working spaces on both sides of the piston. This movability of the valve body engagement ring warrants the overload security function of the device. While the known device has been found valuable in practice, there are still some problems involved: the location of the valve body engagement ring requires a considerable space which is not always available, particularly in small and compact devices. Moreover, the construction of the known device is rather complicated and expensive.

OBJECT OF THE INVENTION

It is a primary object of the present invention to provide a pressure tube-piston device with overload security function, in which the space requirements of excess pressure valve means are reduced. A further object is to provide a pressure tube-piston device in which the excess pressure valve means can be provided with reduced costs.

SUMMARY OF THE INVENTION

A pressure tube-piston device comprises a pressure tube having an axis and two ends and defining a cavity therein. A piston rod unit axially extends through at least one of the two ends and is axially movable with respect to the pressure tube. A piston unit is connected with the piston rod unit within the cavity. The piston unit separates two working spaces within the cavity from each other. The working spaces contain a fluid, namely a liquid or a pressurized gas. The piston rod unit and the piston unit form a piston-piston rod assembly. A flow passage extends within the piston-piston rod assembly between the two working spaces. A valve installation is allocated to this flow passage for selectively opening and closing the flow passage. The valve installation comprises a valve body unit movable with respect to the piston-piston rod assembly and valve body engagement means, engageable by the valve body unit. The valve body unit is movable with respect to the piston-piston rod assembly between a sealing engagement position in which said flow passage is closed and an opening position in which the flow passage is open. The positioning of said valve body unit is controlled through an axial bore of the piston rod unit, e.g. by a control rod. Excess pressure flow means are provided between the two working spaces. These excess pressure flow means comprise excess pressure valve means providing a connection between the two working spaces through the excess pressure flow means in response to a predetermined pressure difference between the two working spaces. The excess pressure flow means extend through the valve body unit across the valve body engagement means.

The valve body unit may be coaxial with the pressure tube and axially movable with respect to the piston-piston rod assembly along the axis of said pressure tube. The valve body engagement means may comprise a sealing ring stationary with respect to the piston-piston rod assembly and sealingly engageable with a radially outer sealing surface of the valve body unit. The radially outer sealing surface may be a substantially conical sealing surface.

The valve body may extend from one of the working spaces towards a flow chamber within the piston-piston rod assembly. This flow chamber may be connected with the other working space. The valve body engagement means may be located within the piston-piston rod device between said one working space and the flow chamber.

According to a preferred embodiment of the invention, an excess pressure flow chamber is provided within the valve body unit. This excess pressure flow chamber may contain at least one excess pressure valve member cooperating with a respective excess pressure valve seat within the excess pressure flow chamber. The excess pressure valve member is biased towards the respective excess pressure valve seat by excess pressure valve biasing means. The biasing force of the excess pressure valve means may be selected at will. This biasing force defines the pressure difference at which the excess pressure valve means open.

The excess pressure flow chamber may be at least partially located within a basic valve body of the valve body unit and may be at least partially closed by a cap member positionable with respect to the basic valve body. The biasing force of the excess pressure valve biasing means may be adjusted by positioning the cap member with respect to the basic valve body.

The cap member may be screwable with respect to the basic valve body so that by such screwing the biasing force can easily be adjusted.

Elastic sealing means may be provided between the basic valve body and the cap member.

The excess pressure valve member may be a ball-shaped valve member, and the respective excess pressure valve seat may be provided by an exit bore of the excess pressure flow chamber.

The excess pressure valve biasing means may comprise a helical compression spring.

The excess pressure valve member may be made of a softer material than the respective excess pressure valve seat or vice versa. So, a perfect sealing is obtained during a long period of operation. In many cases it will be sufficient that the overload security function occurs only, when overload is applied in one axial direction. It is, however, easily possible according to the principle of the present invention to provide an overload security function in response to overload in two opposite directions. E.g., the excess pressure flow chamber may contain two excess pressure valve members and two respective excess pressure valve seats. One of these excess pressure valve members is liftable from the respective excess pressure valve seat in response to a pressure difference between the working spaces having a first direction. The other of these excess pressure valve members is liftable from the respective excess pressure valve seat in response to a pressure difference between the two working chambers having an opposite direction.

At least one excess pressure valve seat may be provided by the above-mentioned cap member.

In case of two excess pressure valve members, both of them may be loaded by excess pressure valve biasing means.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
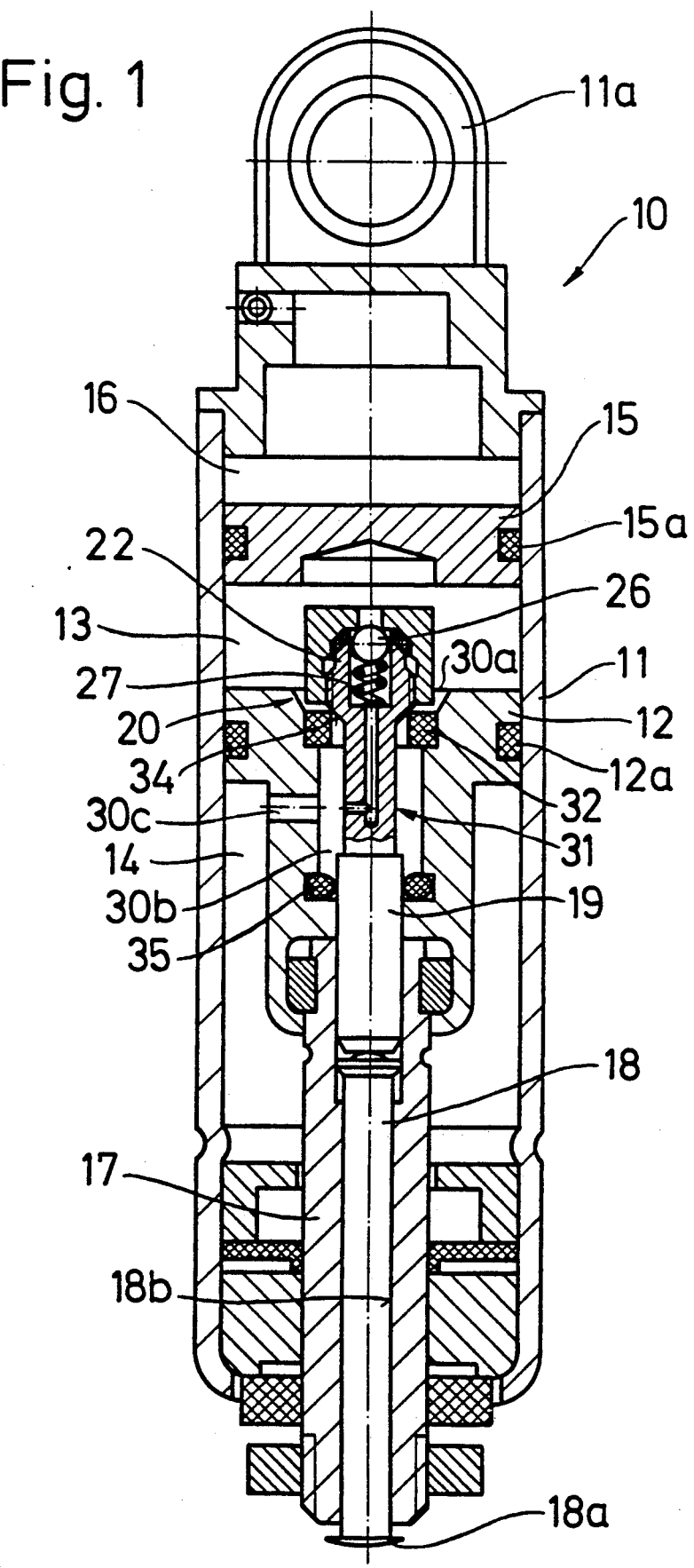
FIG. 1 shows a longitudinal section through a pressure tube-piston device of the present invention.

The pressure tube-piston device 10 as shown in FIG. 1 consists essentially of a pressure tube 11 in which a piston 12 fixed on a piston rod 17 is adapted for inward and outward movement. The piston 12 subdivides the cavity within the pressure tube 11 into a first working space 13 and a second working space 14. Disposed in the first working space 13 is a floating separating piston 15 which separates off a spring chamber 16 filled with a compressible medium, e.g. a pressurized gas. The working spaces 13 and 14 are filled with a liquid, e.g. a hydraulic oil.

The separating piston 15 is sealed by a separating piston seal 15a in respect of the interior wall of the pressure tube 11. At the opposite end from the piston rod 17, the pressure tube 11 is provided with a fixing lug 11a by which it can be secured to a first object. The piston 12 is provided with a piston seal 12a in respect of the interior wall of the pressure tube 11. The piston rod 17 may be provided adjacent its lower end with a second lug (not shown) for being connected to a further object.

Provided in the piston 12 is a valve device 20 within a flow passage 30a, 30b and 30c extending between the working spaces 13 and 14. The flow passage 30a comprises a flow chamber 30b. This flow chamber 30b opens into the working spaces 13 through an axial opening 30a and into working space 14 through at least one radial opening 30c. The valve device 20 comprises a valve body unit 31 and valve body engagement means 32, namely an elastomeric sealing ring. This elastomeric sealing ring 32 is engageable with a conical face 34 of the valve body unit 31. The valve body unite 31 is biased towards engagement with the sealing ring 32 by the pressurized liquid contained within the working space 13. Opening of the valve device is achieved by upward movement of a control rod 18 guided within a bore 18a of the piston rod 17. The valve body unit 31 is sealed against atmosphere by a sealing ring 35 engageable with a shaft 19 of the valve body unit 31. By opening the valve device 20, the piston 12 can be displaced, and thus the length of the pressure tube-piston device 10 can be varied. By closing the valve device 20, the pressure tube-piston device 10 can be locked into any desired position. For actuation of the valve device 20, the control rod 18 is provided which is disposed to extend longitudinally in the hollow bored piston rod 17. At its end which extends out of the piston rod 17, the control rod 18 is provided with a head 18a against which a (not shown) release device can act to actuate the valve device 20.

The valve device 20 is provided with an excess pressure valve device according to the invention. For this purpose, a basic valve body 22 is provided with an excess pressure flow chamber 23 in which there is disposed an excess pressure valve ball 26 loaded by an excess pressure valve spring 27. The excess pressure flow chamber 23 is connected through an axial bore 24 and a radial bore 24a with the working space 14. Moreover, the excess pressure flow chamber 23 opens through an exit bore 28 into the working space 13. The exit 28 defines a valve seat 36 for the excess pressure valve ball 26. The excess pressure valve spring 27 urges the ball against the valve seat 36. The exit 28 and the valve seat 36 are provided by a cap member 25 screwed onto the basic valve body 22 by thread means 37. A sealing ring 29 is provided between the cap member 25 and the basic valve body 22. The prestress of the helical coil spring 27 can be adjusted by screwing the cap member 25 with respect to the basic valve body 22.

The valve ball 26 is made from a material other than that used for the valve seat 36. Either the valve seat 36 is softer than the valve ball 26 or conversely the valve ball is softer than the valve seat 36.

Figure 3:
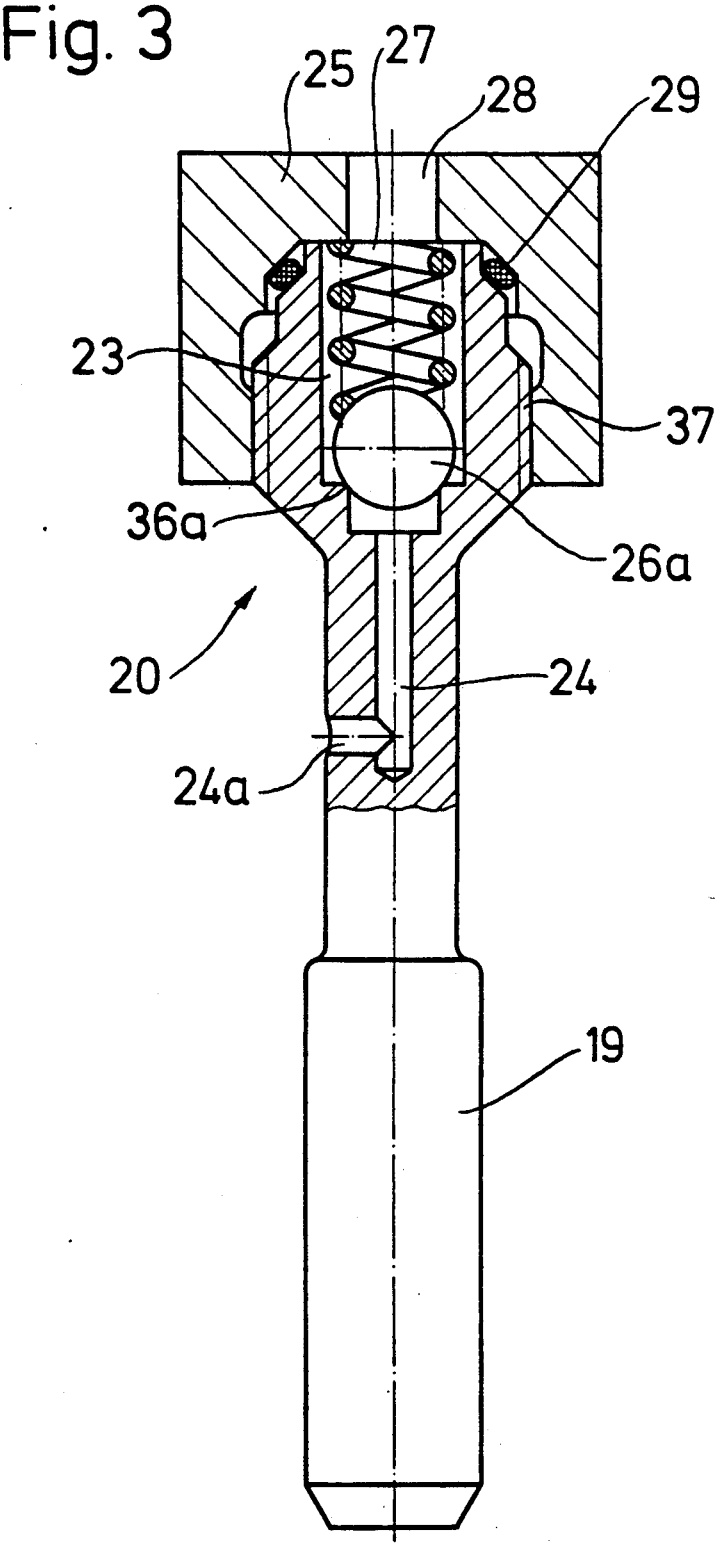
FIG. 3 shows an alternative embodiment of the valve body unit.

In case of the embodiment shown in FIG. 3, the valve seat 36a is provided at the end of the axial bore 24 and cooperates with excess pressure valve ball 26a.

Figure 2:
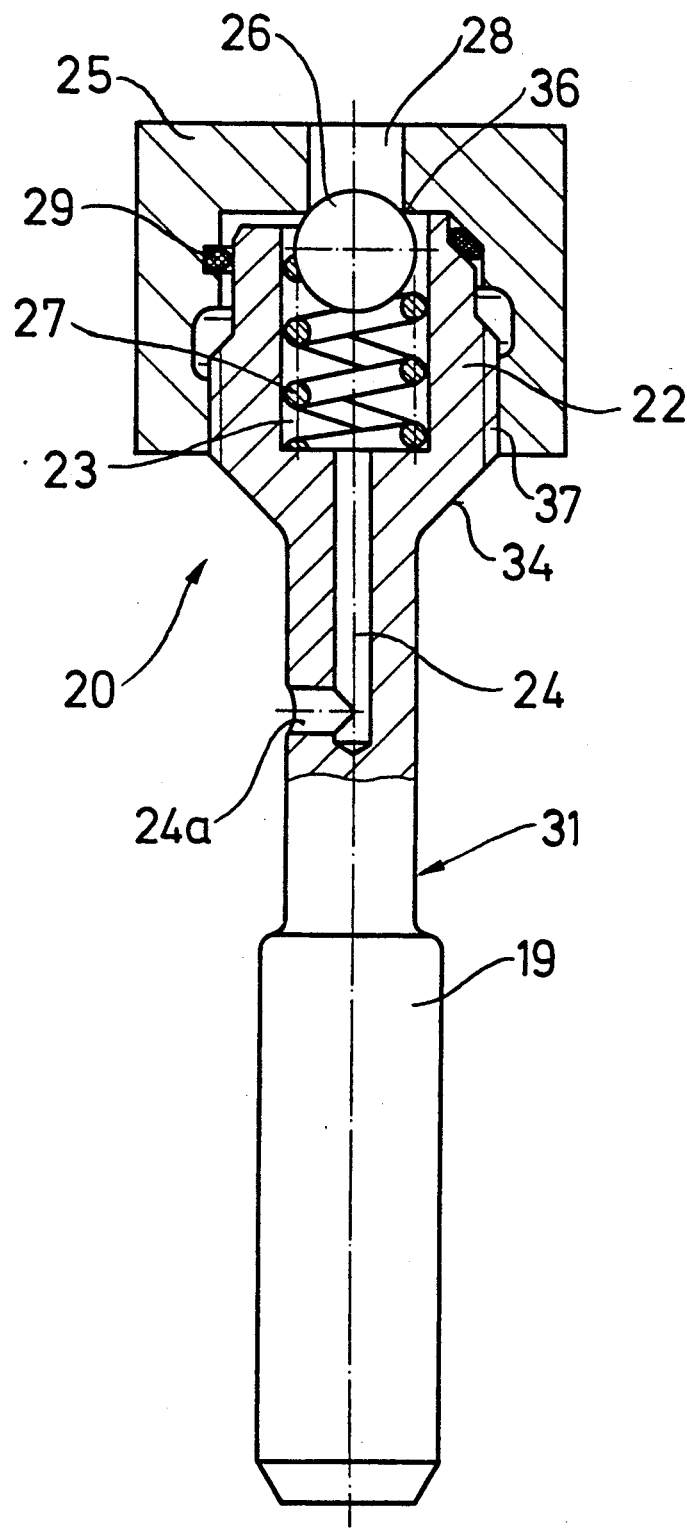
FIG. 2 shows a detail of FIG. 1, namely a valve body unit according to a first embodiment of the invention

In the embodiment of FIG. 2, the excess pressure valve means 36, 26 are opened, when the predetermined pressure difference between a higher pressure in the working space 13 and a lower pressure in the working space 14 exists due to a compressive load on the device 10. In the embodiment of FIG. 3, the excess pressure valve 36a, 26a opens, if a predetermined pressure difference occurs between a higher pressure within the working space 14 and a lower pressure within the working space 13 as a result of tensional forces acting in the sense of withdrawal of the piston rod 17 with respect to the pressure tube 11.

It is readily understandable that the embodiments of FIG. 2 and FIG. 3 can be combined so that the device has an excess pressure security function for both loading directions.

While a specific embodiment of the invention has been shown and described in detail to illustrate the application of the inventive principles, it will be understood that the invention may be embodied otherwise without departing from such principles.

The reference numerals in the claims are only used for facilitating the understanding and ar by no means restrictive.

We claim:

1. A pressure tube-piston device (10) comprising a pressure tube (11) having an axis and two ends and defining a cavity (13,14,16) therein, a piston rod unit (17) axially extending through at least one of said two ends and being axially movable with respect to said pressure tube (11), a piston unit (12) connected with said piston rod unit (17) within said cavity (13,14,16), said piston unit (12) separating two working spaces (13,14) within said cavity (13,14,16) from each other, said working spaces (13,14) containing a fluid, said piston rod unit (17) and said piston unit (12) being combined as a piston-piston rod assembly (12,17), a flow passage (30a, 30b, 30c) extending within said piston-piston rod assembly (12,17) between said two working spaces (13,14), valve means (20) being allocated to said flow passage (30a, 30b, 30c) for selectively opening and closing said flow passage (30a, 30b, 30c), said valve means (20) comprising a valve body unit (31) and valve body engagement means (32), said valve body unit (31) being movable with respect to said piston-piston rod assembly (12,17) between a sealing engagement position relative to said valve body engagement means (32) in which said flow passage (30a, 30b, 30c) is closed, and an opening position relative to said valve body engagement means (32) in which said flow passage (30a, 30b, 30c) is open, the positioning of said valve body unit (31) being controllable through an axial bore (18a) of said piston rod unit (17), excess pressure flow means (28,23,24,24a,26,36) extending through said valve body unit (31) across said valve body engagement means (32) to provide a flow passage between said two working spaces (13,14), said excess pressure flow means (28,23,24,24a,26,36) comprising excess pressure valve means (26, 36) for providing a connection between said working spaces (13,14) through said excess pressure flow means (28,23,24,24a,26,36) in response to a predetermined pressure difference between said working spaces (13,14), an excess pressure flow chamber (23) being provided within said valve body unity (31), said excess pressure flow chamber (23) containing at least one excess pressure valve member (26) cooperating with a respective excess pressure valve seat (36) within said excess pressure flow chamber (23), said excess pressure valve member (26) being biased towards the respective excess pressure valve seat (36) by excess pressure valve biasing means (27), said excess pressure flow chamber (23) being at least partially located within a basic valve body (22) of said valve body unit (31) and being at least partially closed by a cap member (25) positionable with respect to said basic valve body (22), and at least one excess pressure valve seat (36) being provided by said cap member (25).

2. A pressure tube-piston device as set forth in claim 1, said valve body unit (31) being coaxial with said pressure tube (11) and being axially movable with respect to said piston-piston rod assembly (12,17) along the axis of said pressure tube (11), said valve body engagement means (32) comprising a sealing ring (32) stationary with respect to said piston-piston rod assembly (12,17) and sealingly engageable with a radially outer sealing surface (34) of said valve body unit (31).

3. A pressure tube-piston device as set forth in claim 2, said radially outer sealing surface (34) being a substantially conical sealing surface.

4. A pressure tube-piston device as set forth in claim 1, said valve body unit (31) extending from one (13) of said working spaces (13,14) towards a flow chamber (30b) of said flow passage (30a,30b,30c) within said piston-piston rod assembly (12,17), said flow chamber (30b) being connected with the other working space (14), said valve body engagement means (32) being located within said piston-piston rod assembly (12,17) between said one working space (13) and said flow chamber (30b).

5. A pressure tube-piston device as set forth in claim 1, said excess pressure valve biasing means (27) being subject to variable prestress in response to positioning said cap member (25) with respect to said basic valve body (22).

6. A pressure tube-piston device as set forth in claim 5, said cap member (25) being screwable with respect to said basic valve body (22).

7. A pressure tube-piston device as set forth in claim 1, elastic sealing means (29) being provided between said basic valve body (22) and said cap member (25).

8. A pressure tube-piston device as set forth in claim 1, said excess pressure valve member (26) being a ball-shaped valve member (26), the respective excess pressure valve seat (36) being provided by an exit bore (18) of said excess pressure flow chamber (23).

9. A pressure tube-piston device as set forth in claim 1, said excess pressure valve biasing means (27) comprising a helical compression spring (27).

10. A pressure tube-piston device as set forth in claim 1, said excess pressure valve member (26) being made of a softer material than the respective excess pressure valve seat (36).

11. A pressure tube-piston device as set forth in claim 1, said excess pressure valve member (26) being made of a harder material than the respective excess pressure valve seat (36).

12. A pressure tube-piston device (10) comprising a pressure tube (11) having an axis and two ends and defining a cavity (13,14,16) therein, a piston rod unit (17) axially extending through one end of said two ends and being axially movable with respect to said pressure tube (11), a piston unit (12) connected with said piston rod unit (17) within said cavity (13,14,16), said piston unit (12) separating two working spaces (13,14) within said cavity (13,14,16) from each other, said working spaces (13,14) containing a fluid, said piston rod unit (17) and said piston unit (12) being combined as a piston-piston rod assembly (12,17), a flow passage (30a,30b,30c) extending within said piston-piston rod assembly (12,17) between said two working spaces (13,14), valve means (20) being allocated to said flow passage (30a,30b,30c) for selectively opening and closing said flow passage (30a,30b,30c), said valve means

(20) comprising a valve body unit (31) and valve body engagement means (32), said valve body unit (31) being movable with respect to said piston-piston rod assembly (12,17) between a sealing engagement position relative to said valve body engagement means (32) in which said flow passage (30a,30b,30c) is closed, and an opening position relative to said valve body engagement means (32) in which said flow passage (30a,30b,30c) is open, the positioning of said valve body unit (31) being controllable through an axial bore (18a) of said piston rod unit (17), excess pressure flow means (28,23,24,24a,26,36) extending through said valve body unit (31) across said valve body engagement means (32) to provide a flow passage between said two working spaces (13,14), said excess pressure flow means (28,23,24,24a,26,36) comprising excess pressure valve means (26,36) for providing a connection between said working spaces (13,14) through said excess pressure flow means (28,23,24,24a) in response to a predetermined pressure difference between said working spaces (13,14), said valve body unit (31) being coaxial with said pressure tube (11) and being axially movable with respect to said piston-piston rod assembly (12,17) along the axis of said pressure tube (11), said valve body engagement means (32) comprising a sealing ring (32) stationary with respect to said piston-piston rod assembly (12,17), said valve body unit (31) extending from one (13) of said working spaces (13,14) towards a flow chamber (30b) of said flow passage (30a,30b,30c) within said piston-piston rod assembly (12,17), said flow chamber (30b) being connected with the other working space (14), said sealing ring (32) of said valve body engagement means (32) being located at said piston-piston rod assembly (12,17) between said one working space (13) and said flow chamber (30b), said one working space (13) being remote from said one end of said pressure tube (11), said other working space (14) being closer to said one end of said pressure tube (11), said valve body unit (31) having a basic valve body (22) adjacent said one working space (13) and a shaft portion (19) extending into said flow chamber (30b), said basic valve body (22) having a larger diameter than said shaft portion (19), said basic valve body (22) being sealingly engageable with said sealing ring (32) of said valve body engagement means (32), an excess pressure flow chamber (23) of said excess pressure flow means (28,23,24,24a) being formed within said basic valve body (22), said basic valve body (22) being provided with a cap member (25) located within said one working space (13), said excess pressure flow chamber (23) having an excess pressure exit (28) towards said one working space (13) through said cap member (25) and an excess pressure duct (24,24a) through said shaft portion (19) towards said flow chamber (30b), said excess pressure flow chamber (23) containing at least one excess pressure valve member (26,26a) being biased towards an excess pressure valve seat (36,36a) allocated to one of said excess pressure exit (28) and said excess pressure duct (24,24a).

13. A pressure tube-piston device as set forth in claim 12, said cap member (25) being axially positionable with respect to said basic valve body (22).

14. A pressure tube-piston device as set forth in claim 13, said excess pressure flow chamber (23) accommodating excess pressure valve biasing means (27) being subject to variable prestress in response to positioning said cap member (25) with respect to said basic valve body (22).

15. A pressure tube-piston device as set forth in claim 14, said cap member (25) being screwable with respect to said basic valve body (22).

16. A pressure tube-piston device as set forth in claim 12, said basic valve body (22) having a substantially conical sealing surface (34) for engagement with said sealing ring (32) of said valve body engagement means (32).

17. A pressure tube-piston device as set forth in claim 12, elastic sealing means (29) being provided between said basic valve body (22) and said cap member (25).

18. A pressure tube-piston device as set forth in claim 12, said excess pressure valve member (26) being a ball-shaped valve member (26).

19. A pressure tube-piston device as set forth in claim 12, said excess pressure valve member (26,26a) being biased by a helical compression spring (27).

20. A pressure tube-piston device as set forth in claim 12, said excess pressure valve member (26,26a) being made of a softer material than the respective excess pressure valve seat (36,36a).

21. A pressure tube-piston device as set forth in claim 12, said excess pressure valve member (26,26a) being made of a harder material than the respective excess pressure valve seat (36,36a).

* * * * *

UNITED STATES PATENT AND TRADEMARK OFFICE
CERTIFICATE OF CORRECTION

PATENT NO. : 5,116,028
DATED : May 26, 1992
INVENTOR(S) : Mintgen et al.

It is certified that error appears in the above-identified patent and that said Letters Patent is hereby corrected as shown below:

Title page, last line of Item 75, "Netherlands" should read --Fed. Rep. of Germany--.

Col. 1, line 21, "such as" should read --such an--.

Col. 4, line 11, "unite" should read --unit--.

Col. 5, line 11, "ar" should read --are--.

Signed and Sealed this

Third Day of August, 1993

Attest:

MICHAEL K. KIRK

Attesting Officer

Acting Commissioner of Patents and Trademarks